Sept. 2, 1969 J. R. DAILEY ET AL 3,465,136

ANALOG TIME-DIVISION MULTIPLIER WITH RECIRCULATING STORAGE

Filed Oct. 3, 1966 3 Sheets-Sheet 1

INVENTORS
JACK R. DAILEY
RICHARD L. LAKE
BY [signature]
AGENT

Sept. 2, 1969 J. R. DAILEY ETAL 3,465,136

ANALOG TIME-DIVISION MULTIPLIER WITH RECIRCULATING STORAGE

Filed Oct. 3, 1966 3 Sheets-Sheet 2

ANALOG TIME-DIVISION MULTIPLIER WITH RECIRCULATING STORAGE

Filed Oct. 3, 1966 3 Sheets-Sheet 3

United States Patent Office 3,465,136

Patented Sept. 2, 1969

3,465,136

ANALOG TIME-DIVISION MULTIPLIER WITH RECIRCULATING STORAGE

Jack R. Dailey, Apalachin, and Richard L. Lake, Binghamton, N.Y., assignors to International Business Machines Corporation, Armonk, N.Y., a corporation of New York Filed Oct. 3, 1966, Ser. No. 583,905

Int. Cl. G06g 7/16

U.S. Cl. 235—194 5 Claims

ABSTRACT OF THE DISCLOSURE

An improved analog multiplier system utilizing recirculating storage that includes a modulating driver circuit which integrates the input signals and produces a resultant current signal for energizing a magnetostrictive delay line storage medium and a sense amplifier for reading the voltage output signals from the magnetostrictive delay line. The outputs from the sense amplifier are fed in a recirculating pattern through a voltage-time sensor circuit to a charge generating circuit to produce a feedback pulse to the modulating driver circuit.

The present invention relates to a time-division multiplier system, and more particularly, to a new and improved analog multiplier system utilizing recirculating storage.

The analog multiplier is a device whose output is a quantity which is proportional to the instantaneous product of two time-varying input quantities. Such a device is finding wide application in the present day art, particularly in the field analog computers and communication systems. Multipliers for analog computer use are generally characterized by very high accuracy and moderate speed requirements. On the other hand, multipliers for communication systems require only moderate accuracy but must have a relatively large bandwidth. There are many ways of practically implementing an analog multiplier. Among these are the mechanical servo multipliers and Hall-effect multipliers both of which are limited in their bandwidth capabilities with respect to at least one of the input quantities. Other more complicated transistor or vacuum tube circuits have been developed in order to obtain high speed multipliers wherein a pulse train is amplitude modulated by one of the input signals and pulse-width modulated by the other input signal. The pulse train is then integrated with the integral being the desired product. A four quadrant analog multiplier has been developed and adapted for use in communication system applications and uses the variable channel conductance properties of the field effect transistor. With the interest and activity in the development of analog multipliers, it is recognized that some challenging and knotty problems are evolved. There is a definite need for faster opearting multipliers with improved accuracy.

A primary object of this invention is to provide an improved and novel electronic multiplier of analog signals.

It is an object of the invention to provide a new and improved analog time-division multiplier utilizing recirculating storage.

It is a further object of the invention to provide new and improved time-division multiplier circuitry that is small, rugged and relatively simple.

Still another object of the invention is to provide a new and improved analog computer circiut which multiplies two analog functions to obtain an output function.

It is a further object of the present invention to provide a novel analog multiplier circuit of minimum complexity and size and having low power requirements.

Another object of the present invention is to produce a current which has an average magnitude which is proportional to the product of a voltage amplitude and time.

In accordance with the invention, an arrangement for carrying out the aforementioned objects includes a modulating driver circuit which integrates the input signals and produces a resultant current signal for energizing a magnetostrictive delay line storage medium and a sense amplifier for reading the voltage signals from the magnetostrictive delay line. The output from the sense amplifier is then fed through a voltage-time sensor circuit to a charge generating circuit to produce a feedback to the modulating driver circuit.

The foregoing and other objects, features and advantages of the invention will be apparent from the following more particular description of a preferred embodiment of the invention, as illustrated in the accompanying drawings.

In the drawings:

FIG. 1 diagrammatically illustrates an embodiment of the electronic analog time-division multiplier constructed according to the present invention.

Figure 1:
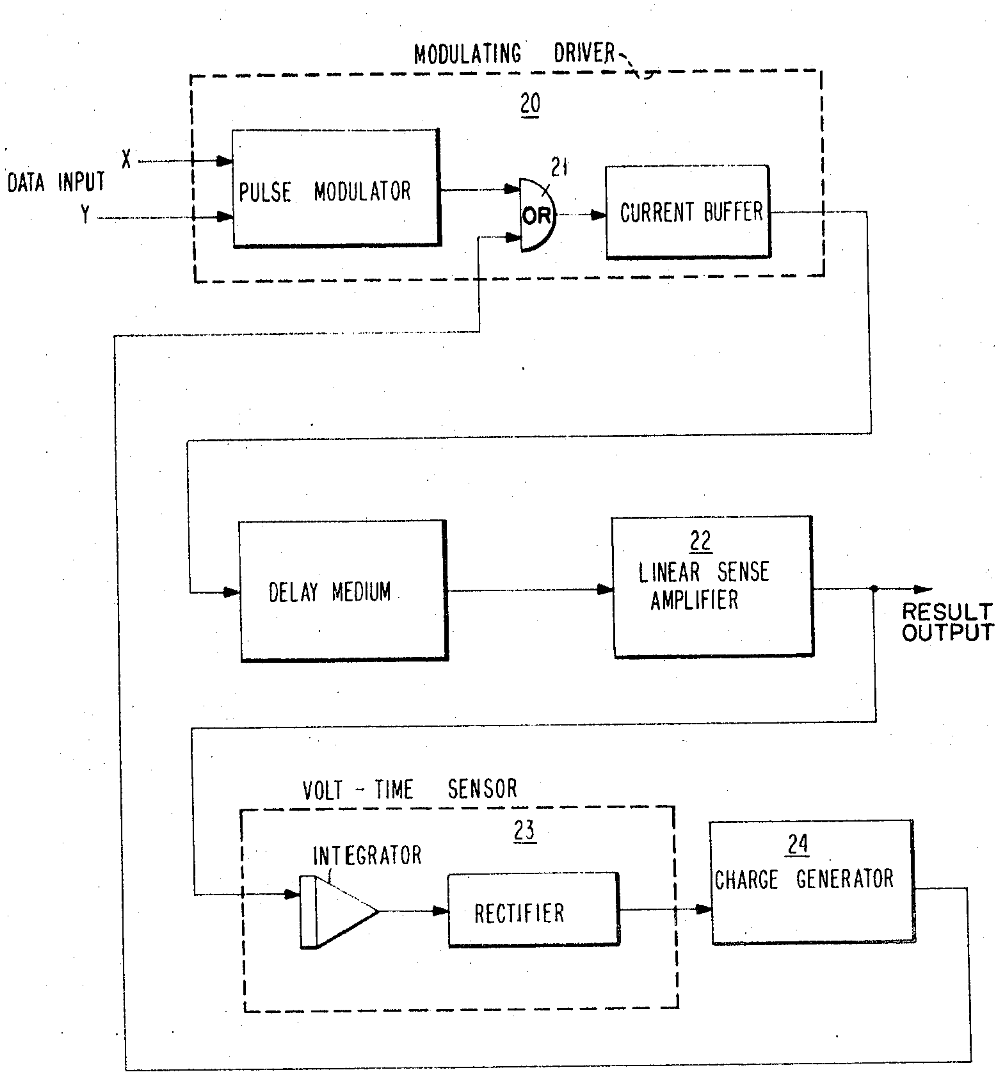

Referring to FIG. 1, the analog time-division multiplier constructed according to the present invention comprises a modulating driver 20 that includes an input exclusive OR gate 21 such that the driver is controlled by the X and Y inputs or the recirculating data, but not by both. The X and Y inputs are combined to modulate the amplitude and width of the input pusle which is fed to the exclusive OR gate 21. The sense amplifier 22 may be any linear amplifier biased to operate in a class B mode such that the amplified voltage output contains the desired information in pulses. The volt-time sensor 23 is a low-cost operational amplifier integrator wherein the output is a volt-time integral of the input, such that the input is a voltage $v_{in}(t)$, the output is a voltage $$v_0=\int_0^t v_{in}(t)\,dt$$

The integrated voltage can be rectified to provide a D-C voltage whose level is proportional to the integrator input voltage. The charge generator 24 is a conventional or well-known type of Schmitt trigger which provides a rectangular output pulse that begins when the D-C input exceeds a set level and ends when the D-C falls below the predetermined level. Accordingly, the output has a fixed amplitude and a pulse width proportional to the D-C input. The output from the Schmitt trigger can be fed into the delay line driver where the voltage pulse is converted to a current pulse whose area is proportional to that of the original input pulse.

Figure 2:
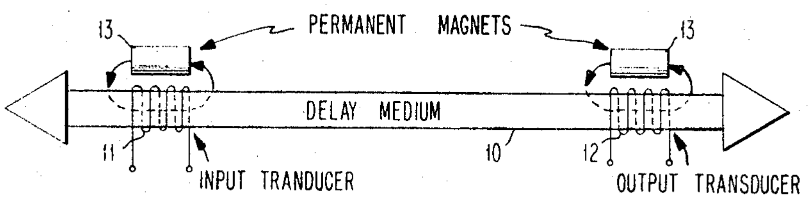
FIG. 2 is a diagrammatical representation of a longitudinal magnetostrictive delay line structure.

A magnetostrictive delay line can be constructed as shown in FIG. 2, which is commonly referred to as the longitudinal magnetostrictive delay line. Herein a metallic wire 10 having good magnetostrictive properties has an input transducer winding 11 and output transducer winding 12 near opposite ends. The ends of the line are terminated in soft shock absorbent dampers commonly referred to as damping pads. Two bias magnets 13 are placed in proximity to the transducers such that their magnetic fields pass through the wire medium within the windings. When an input current is applied to the input transducer 11, a magnetic field in excess of the bias field is induced in the medium parallel to the axis of the transducer winding. This causes the material within the winding to expand or contract depending on whether the material has positive or negative magnetostriction (Joule effect). For example, nickel exhibits negative magnetostriction and a rarefaction would occur beneath the winding when current was applied. The rarefaction or contraction appears as a strain pulse that is propagated from the transducer in both directions at the velocity of sound within the medium. The pulse that is propagated toward the termination is absorbed by the damping pad to prevent reflections. The pulse that is traveling in the other direction eventually passes beneath the receiving transducer where it intercepts the flux of the bias magnetic field and the opposite magnetostrictive (Villari) effect will take place. This generates a voltage in the output transducer winding and a pulse having a shape similar to that shown in FIG. 5 appears at the output terminals. The strain pulse is attenuated when it reaches the other damping pad to prevent reflections. A line operating in this fashion is termed a longitudinal line and it is required that the delay medium damping pad have good magnetostrictive and acoustic properties to yield minimum attenuation. Large delays demand long longitudinal lines which is in contrast to achieving minimum attenuation and distortion but the length presents a packaging problem.

Figure 3:
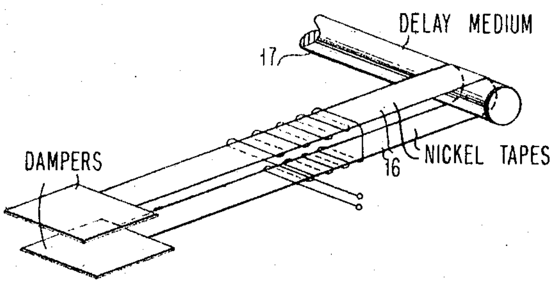
FIG. 3 is a diagrammatic representation of a torsional magnetostrictive delay line structure.

A torsional magnetostrictive type of delay line, as is shown in FIG. 3, tends to overcome many of the restrictions of the longitudinal delay line. The torsional delay line operates by having two mode converters replace the transducers of the longitudinal line. The mode converter comprises two nickel tapes 16 welded to the line 17 with each tape having a winding in the direction as indicated. Magnets are used to bias the tapes. The Joule effect in each winding results in a push-pull motion of the tapes and since these are fixed to the line, rotational or torsional motion is applied at the end of the line. The strain pulse that appears in the line is propagated in a helical path rather than a linear one with the result that it takes substantially longer to travel a given length of line. The receiving mode converter operates in the reverse fashion. The rotational motion moves the nickel tapes which in turn create the push-pull Villari effect in the receiving winding, thereby inducing an e.m.f. at the terminals.

Figure 4:
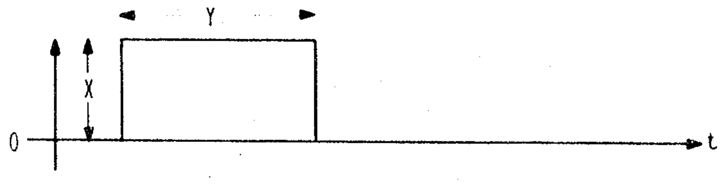
FIG. 4 shows an input pulse modulation curve.
Figure 5:
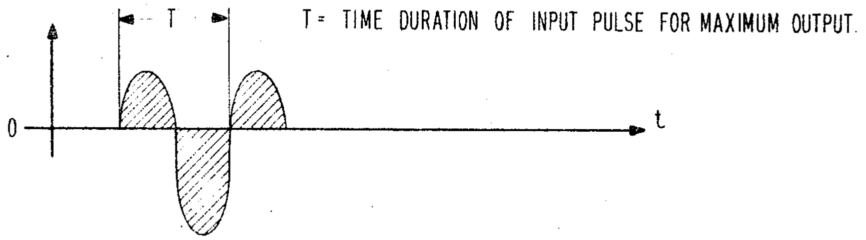
FIG. 5 is a typical voltage representation at the output transducer of the magnetostrictive delay line.

Referring to FIG. 1, there is shown a system for a method of performing analog time-division multiplication with recirculating storage. The modulating driver 20 produces a current pulse to the input transducer for the magnetostrictive delay line that is both amplitude and width modulated according to the input variables X and Y as shown in FIG. 4. The resulting flux is assumed to be linearly proportional to the input current. Thus, the strain pulse that is generated in the magnetostrictive delay line is a super position integration of the input flux over an interval determined by the length of the transducer winding and the speed of transmission within the winding. When the strain pulse reaches the receiver coils, it causes a change in the permeability of the line and a corresponding change in the receiver's magnetic field, thereby inducing a voltage in the receiver winding as the strain pulse passes through it. This voltage may be expressed analytically as a super position integration of the strain pulse over an interval determined by the length of the receiver winding and the acoustical speed of the delay line. Therefore, the output voltage is amplified in the sense amplifier and appears as shown in FIG. 5. Thus far, the transmitted data pulse has been sensed exactly as a digital bit and the subsequent step would be to feed the voltage pulse to a level detector. However, for analog multiplication it is necessary to sense not the level, but the volt-time area making up the output pulse for subsequent presentation as a quantized value. This is essential in order to have a direct correspondence between the input variables and the output. An interesting feature of sensing an area is that a fixed width variable amplitude or a fixed amplitude-variable width regenerating circuit may be inserted in the feedback loop in such a manner that the original amount of charge appears back at the input transducer. Therefore, the magnetostrictive delay line output would receive an identical volt-time output on the second pass and each succeeding pass effectively storing the product information.

Figure 6:
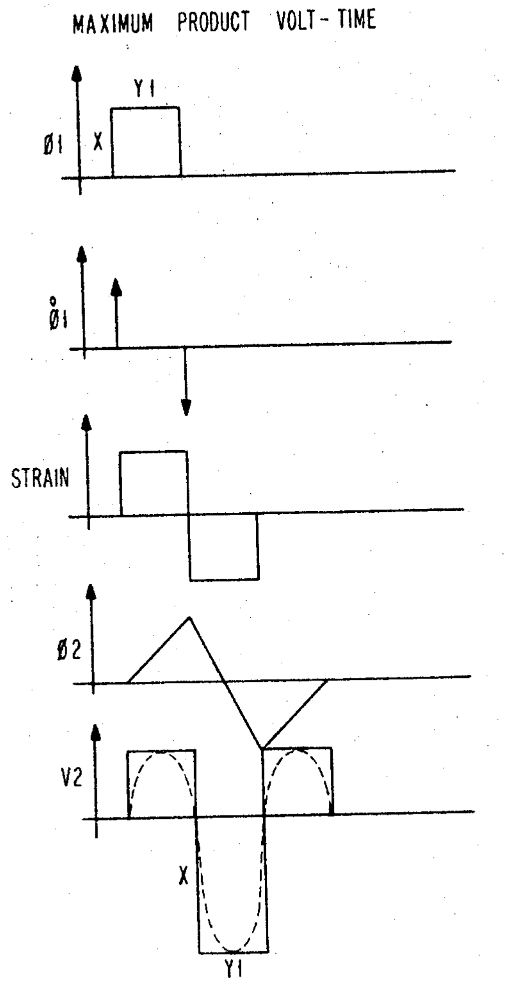
FIG. 6 shows waveform representations for a maximum voltage-time product.
Figure 7:
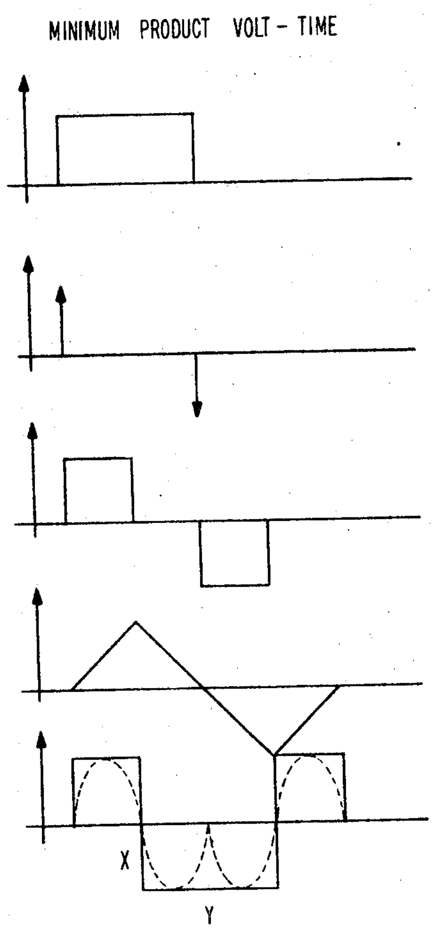
FIG. 7 shows waveform representations of a minimum voltage-time product.

Waveforms showing how the output volt-time changes with changing values of the input variables are schematically shown in FIGS. 6 and 7. The amplitude and width of the input current pulse along with the transducer geometry determines the corresponding amount of overlap in the output voltage waveform. It is possible to vary both the amplitude and duration of the output voltage beyond a threshold level by controlling the charge area of the input transducer. As a result, the output area that exceeds the threshold is a voltage-time product that is unique for each unique amount of charge presented at the input transducer. This is a characteristic of the "amount of charge" rather than the "rate of charge" which produces the following desirable features: (1) if a variable X is assigned to the amplitude and Y is assigned to the duration, the resultant voltage-time output will correspond to the product $kXY$, where $k$=a constant, and will be unique. This analog product is a time-division multiplication of the variables X and Y; (2) if the voltage-time product is sensed and converted to a current level that provides the original amount of charge at the input transducer, then the unique area of XY will again be sensed at the output transducer and in effect the original product has been regenerated and recirculated on the delay line, thus providing analog storage potential; and (3) if the line is sectioned such that locations are assigned corresponding to the maximum voltage-time product, then it is possible to intermingle both digital and analog information with the necessary identification of analog or digital information at the output of the lines being accomplished through on-line flags or the like.

In accordance with the preferred embodiment the novel features may be summarized as: (1) analog multiplication using a delay line; (2) analog regeneration and storage capability; and (3) analog-digital multiplexing capability such that analog information may be received in real time, recirculated on the line and processed at a real time sequence depending upon the number of recirculations.

While the invention has been particularly shown and described with reference to a preferred embodiment thereof, it will be understood by those skilled in the art that various changes in form and details may be made therein without departing from the spirit and scope of the invention.

What is claimed is:

1. A time-division multiplier circuit arrangement comprising:

(a) delay storage means, (b) modulating driver means responsive to input pulses for producing a current pulse for application to the input of said delay storage means, (c) a linear sense amplifier responsive to output signals from said delay line storage means and capable of producing a volt-time output signal which is representative of analog input signals, and (d) a recirculating loop comprising a volt-time sensor responsive to said linear sense amplifier and coupled with said modulating driver means for causing signals to be re-applied to said delay storage means.

2. A time-division multiplier circuit arrangement as defined in claim 1 wherein said volt-time sensor includes rectifying means to provide a D-C voltage which is proportional to an integrated input voltage.

3. A time-division multiplier circuit arrangement as in claim 1 wherein said modulating driver means includes an exclusive OR gate for controllably gating input and recirculating data representing signals into said delay storage means.

4. A time-division multiplier circuit arrangement as in claim 3 wherein said recirculating loop includes a charge generator for producing an output voltage pulse which is proportional to the input pulse thereto.

5. A time-division multiplier circuit arrangement comprising:

(a) delay storage means, (b) modulating driver means responsive to analog input pulses for producing a current pulse and applying it to the input of said delay storage means, (c) a linear sense amplifier responsive to output signals from said delay storage means and capable of producing a volt-time output signal, (d) a recirculating loop connected with an output of said linear sense amplifier and as an input to said modulating driver means, (e) an exclusive OR gate included with said modulating driver means for controllably gating input and recirculating data representing signals into said delay storage means, (f) said recirculating loop including a volt-time sensor responsive to said linear sense amplifier and coupled with said exclusive OR gate for causing signals to be re-applied to said delay storage means.

References Cited

UNITED STATES PATENTS

| | | | |
|---|---|---|---|
| 2,970,766 | 2/1961 | Epstein | 235—165 |
| 2,978,680 | 4/1961 | Schulte | 235—165 X |
| 3,255,341 | 6/1966 | Wilcox | 235—165 |
| 3,277,381 | 10/1966 | Sullivan | 235—165 X |

MALCOLM A. MORRISON, Primary Examiner

J. F. RUGGIERO, Assistant Examiner

U.S. Cl. X.R.

340—174

UNITED STATES PATENT OFFICE

CERTIFICATE OF CORRECTION

Patent No. 3,465,136 September 2, 1969

Jack R. Dailey et al.

It is certified that error appears in the above identified patent and that said Letters Patent are hereby corrected as shown below:

Column 6, after line 11 insert the following:

| | | | |
|---|---|---|---|
| 2,995,305 | 8/1961 | Schmid --------------- | 235-194 |
| 3,007,140 | 10/1961 | Minnick et al. ------- | 340-174 |
| 3,117,242 | 1/1964 | Slack ---------------- | 235-194 |
| 3,165,721 | 1/1965 | Kennedy et al. ------- | 340-173 |
| 3,211,900 | 10/1965 | Bray ----------------- | 235-194 |

Signed and sealed this 13th day of October 1970.

(SEAL)
Attest:

Edward M. Fletcher, Jr.
Attesting Officer

WILLIAM E. SCHUYLER, JR
Commissioner of Patents